UNITED STATES PATENT OFFICE.

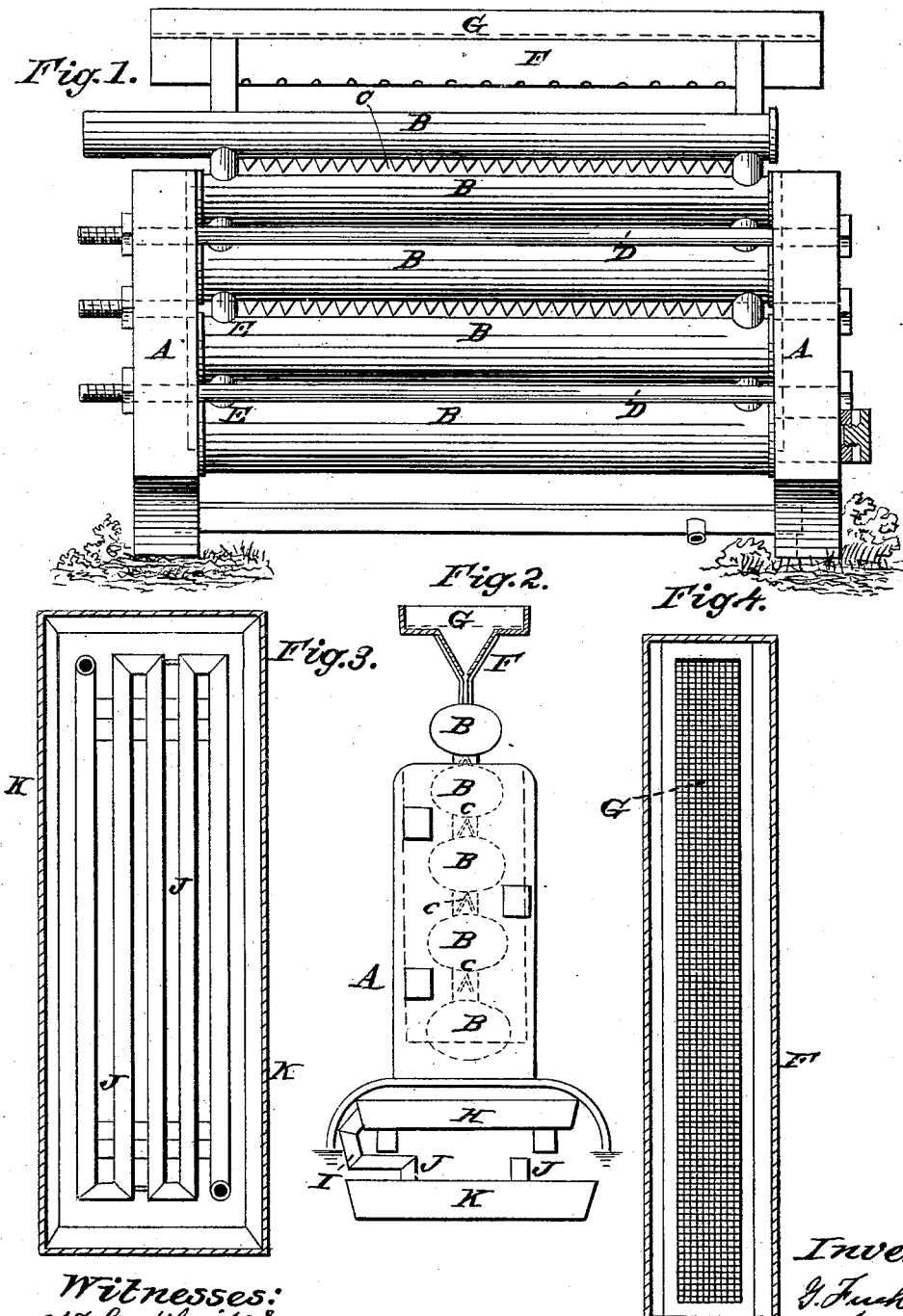

GERHARD FUCHS AND JOSEPH LUIGART, OF LOGANSPORT, INDIANA.

IMPROVEMENT IN BEER-COOLERS.

Specification forming part of Letters Patent No. 78,659, dated June 9, 1868.

*To all whom it may concern:*

Be it known that we, GERHARD FUCHS and JOSEPH LUIGART, of Logansport, in the county of Cass, and in the State of Indiana, have invented certain new and useful Improvements in Beer-Coolers; and do hereby declare that the following is a full, clear, and exact description thereof, reference being had to the accompanying drawings, and to the letters of reference marked thereon.

In the annexed drawings, making part of this specification, A A represent the two heads of a vertical frame, which are placed at a suitable distance apart, so as to embrace the ends of a series of pipes, B B. D D represent bolts, which pass through the heads and from one to the other, for the purpose of bearing them against the ends of the pipes and securing the whole together. These pipes B B are oval in shape, and are of different diameters, being graduated from top to bottom. The upper pipe is smallest and the lower pipe largest in the series. These pipes have connecting-pipes E, so that when water has passed the length of one it enters the next, and so on until it has passed through the whole series.

Flanges C C, made in the shape of saw-teeth, project from the bottom of each pipe, except the lower one. These teeth set alternately to each side of the pipes, so that they will distribute the beer which passes over them equally on both sides.

F represents a V-shaped trough or box, which is placed immediately over the upper pipe B. This box or trough is provided with a wire sieve or screen, G, and its bottom is perforated with holes, to allow beer to pass through it.

A stream of water is passed through the series of pipes B B, entering the lower pipe and passing out at one end of the upper pipe. The beer to be cooled is poured into the trough or box F, passes through the sieve G, and then through the perforations in the bottom of the trough, and, falling upon the upper pipe B, passes over it, and continues its passage over the series of pipes, being distributed equally over them by the teeth or flanges C C. When the beer leaves the lower pipe B, it falls into a vat or pan, H, and from this pan it passes into a pipe, I, and is conveyed down into a tortuous pipe, J, which lies in a vat or pan, K. The pan K is filled with ice, and, the pipe J coming in contact with this ice, the beer in said pipe is, of course, kept very cool. The beer is drawn off through one end of the pipe J after having passed through it backward and forward through the pan K.

By this arrangement we cool the beer thoroughly, and that, too, at very small expense. After the beer has been passed over the water-pipes it requires but little ice to finish the cooling process.

We do not claim the arrangement of the pipes B B, as seen in the patent of J. L. Beaudelot, issued November 1, 1859, and reissued January 28, 1862; nor do we claim the pipes of decreasing diameters from the bottom upward, as seen in the patent of D. Cammerer, of March, 1867; but What we do claim is—

The pan H and ice-pan K, provided with a tortuous pipe, J, through which the beer is passed and cooled, substantially in the manner specified, and arranged under the pipes B B, as herein described, all operating for the purposes set forth.

In testimony that we claim the foregoing, we have hereunto set our hands this 28th day of February, 1868.

GERHARD FUCHS.
JOSEPH LUIGART.

Witnesses:
JULIUS C. KLOEMER,
THOMAS B. HELM.